(12) United States Patent
Coates

(10) Patent No.: US 7,547,025 B2
(45) Date of Patent: Jun. 16, 2009

(54) ASSEMBLY AND METHOD FOR LOWERING AND RAISING A TRANSPORT TRAILER BED FOR LOADING AND UNLOADING A TRAILER

(76) Inventor: George J. Coates, Route 34 & Ridgewood Rd., Wall, NJ (US) 07719

( * ) Notice: Subject to any disclaimer, the term of this patent is extended or adjusted under 35 U.S.C. 154(b) by 89 days.

(21) Appl. No.: 11/356,410

(22) Filed: Feb. 17, 2006

(65) Prior Publication Data

US 2006/0192356 A1 Aug. 31, 2006

Related U.S. Application Data

(60) Provisional application No. 60/655,919, filed on Feb. 25, 2005.

(51) Int. Cl.
*B62D 61/12* (2006.01)
*B60S 9/00* (2006.01)
(52) U.S. Cl. .................................. 280/43.23; 280/43.2
(58) Field of Classification Search .................. 280/43, 280/43.1, 43.13, 43.2, 43.21, 43.23, 46, 414.5, 280/441.2
See application file for complete search history.

(56) References Cited

U.S. PATENT DOCUMENTS

| 1,045,120 | A | * | 11/1912 | Burroughs | .................. 254/6 R |
| 2,262,404 | A | * | 11/1941 | Pavliska | .................. 280/43.21 |
| 2,278,215 | A | * | 3/1942 | Poche | .................. 440/12.69 |
| 3,544,127 | A | * | 12/1970 | Dobson | .................. 280/43.17 |
| 4,077,642 | A | * | 3/1978 | Clark | .................. 280/43.2 |
| 4,258,560 | A | * | 3/1981 | Jessop | .................. 70/252 |
| 5,161,814 | A | * | 11/1992 | Walker | .................. 280/414.5 |
| 5,778,488 | A | * | 7/1998 | Tsai | .................. 16/34 |
| 7,163,212 | B1 | * | 1/2007 | Rupp | .................. 280/43.17 |

\* cited by examiner

Primary Examiner—Frank B Vanaman
(74) Attorney, Agent, or Firm—Clifford G. Frayne

(57) ABSTRACT

A method and apparatus for lowering and raising the floor bed of a transport trailer to facilitate loading and unloading, the transport trailer having at least one pair of wheels mounted on a swing arm, the swing arm connected to a transverse axle, the transverse axle having mounted thereon a first quarter bevel gear in communication with a worm drive gear combination for raising and lowering the swing arms and thus raising or lowering the trailer bed, there being at least one second quarter bevel gear and worm drive gear combination in communication with a motor and a V-shaped yoke, the worm gears being mounted on a common shaft extending from the motor rearwardly to a manual coupling which would permit the manual lowering and raising of the trailer bed in the absence of motor power.

3 Claims, 3 Drawing Sheets

ASSEMBLY AND METHOD FOR LOWERING AND RAISING A TRANSPORT TRAILER BED FOR LOADING AND UNLOADING A TRAILER

RELATED APPLICATIONS

Applicant claims the benefit of provisional application Ser. No. 60/655,919, filed Feb. 25, 2005.

BACKGROUND OF THE INVENTION

1. Field of the Invention

The present invention relates to transport trailers and in particular, transport trailers which are towed by a vehicle having a tow hitch, and in particular, a method and assembly which allows the transport trailer and trailer bed to be lowered for either loading or unloading the trailer and then raised when being towed by the vehicle.

2. Description of the Prior Art

Transport trailers towed by vehicles are used for a myriad of purposes. The particular application which gave rise to the present invention was with respect to trailer utilized to haul or transport custom motorcycles. In the prior art, the trailer bed was of a fixed height and ramps had to be utilized in order to roll the motorcycle up into the trailer on the trailer bed. Depending upon the size of the trailer and the height of the trailer bed, this was oftentimes a cumbersome task requiring several individuals since it was not possible to drive the motorcycle into the trailer, and it had to be pushed up a ramp and into the trailer.

While the method and apparatus disclosed herein was developed to address the aforementioned situation, the method and apparatus would have application to any towed transport trailer in which materials or goods are towed and would allow the more facile loading and unloading of the trailer because the trailer bed could be lowered and raised, thereby allowing more facile ingress and egress to the trailer and the contents thereof.

OBJECTS OF THE INVENTION

An object of the present invention is to provide for a novel assembly which permits an operator to raise and lower a transport trailer bed to allow more facile ingress and egress with respect to loading same.

A still further object of the present invention is to provide for a novel assembly for lowering and raising a transport trailer bed which secures the trailer bed in a raised locked position when being towed by a vehicle.

A still further object of the present invention is to provide for a novel assembly for raising and lowering the bed of a transport trailer so as to eliminate the necessity of using ramps or the like for loading objects into the trailer.

A still further object of the present invention is to provide for a novel method which allows for the operator to raise or lower the bed of a towed transport trailer either manually, mechanically, electrically, or hydraulically.

SUMMARY OF THE INVENTION

A method and apparatus for lowering and raising the floor bed of a transport trailer to facilitate loading and unloading, the transport trailer having at least one pair of wheels mounted on a swing arm, the swing arm connected to a transverse axle, the transverse axle having mounted thereon a first quarter bevel gear in communication with a worm drive gear combination for raising and lowering the swing arms and thus raising or lowering the trailer bed, there being at least one second quarter bevel gear and worm drive gear combination in communication with a motor and a V-shaped yoke, the worm gears being mounted on a common shaft extending from the motor rearwardly to a manual coupling which would permit the manual lowering and raising of the trailer bed in the absence of motor power.

BRIEF DESCRIPTION OF THE DRAWINGS

These and other advantages and improvements will be evident, especially when taken in light of the following illustrations wherein.

DETAILED DESCRIPTION OF THE DRAWINGS

Figure 1:
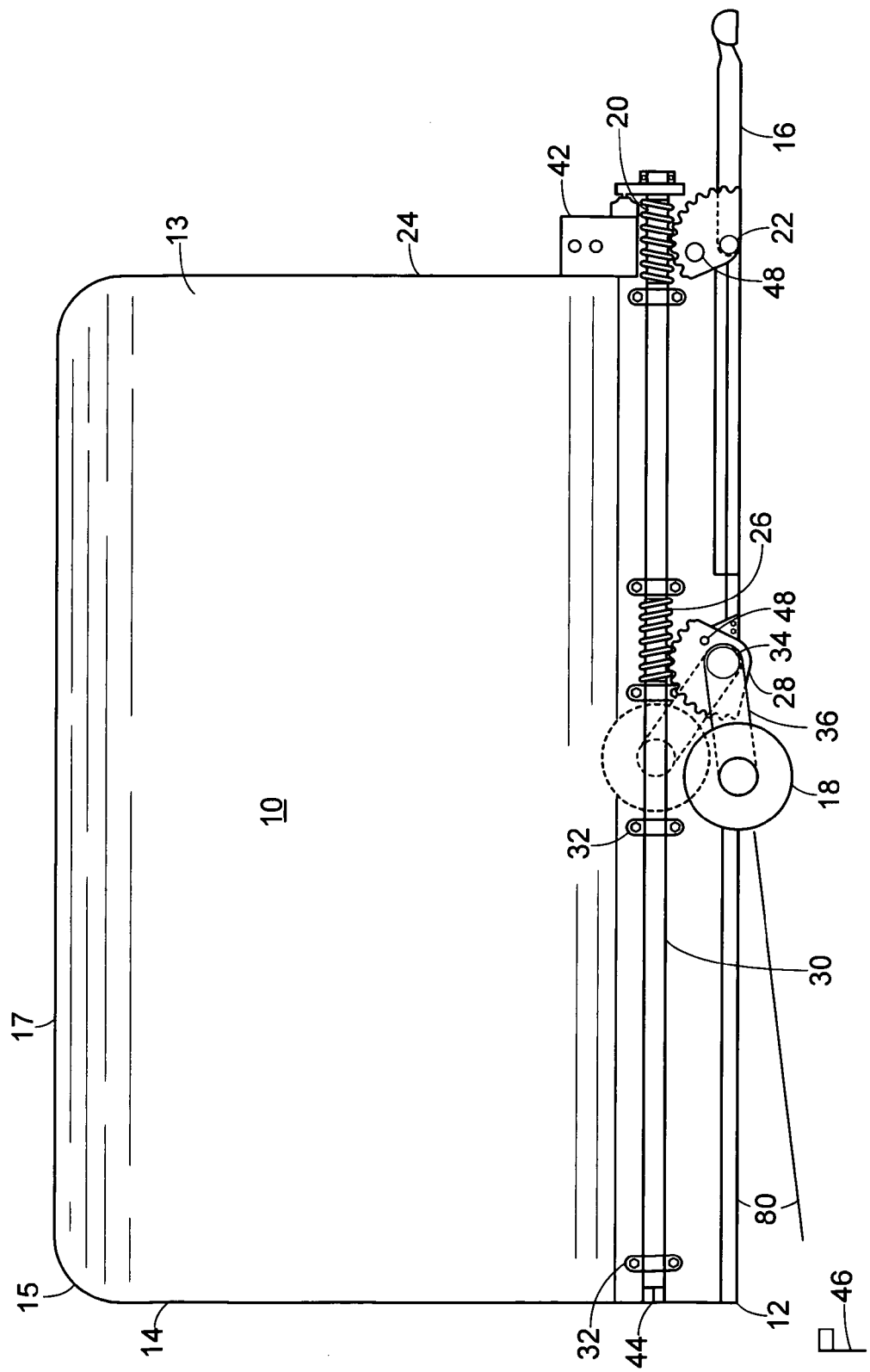
FIG. 1 is a side view of a transport trailer incorporating the assembly for raising and lowering the trailer.
Figure 2:
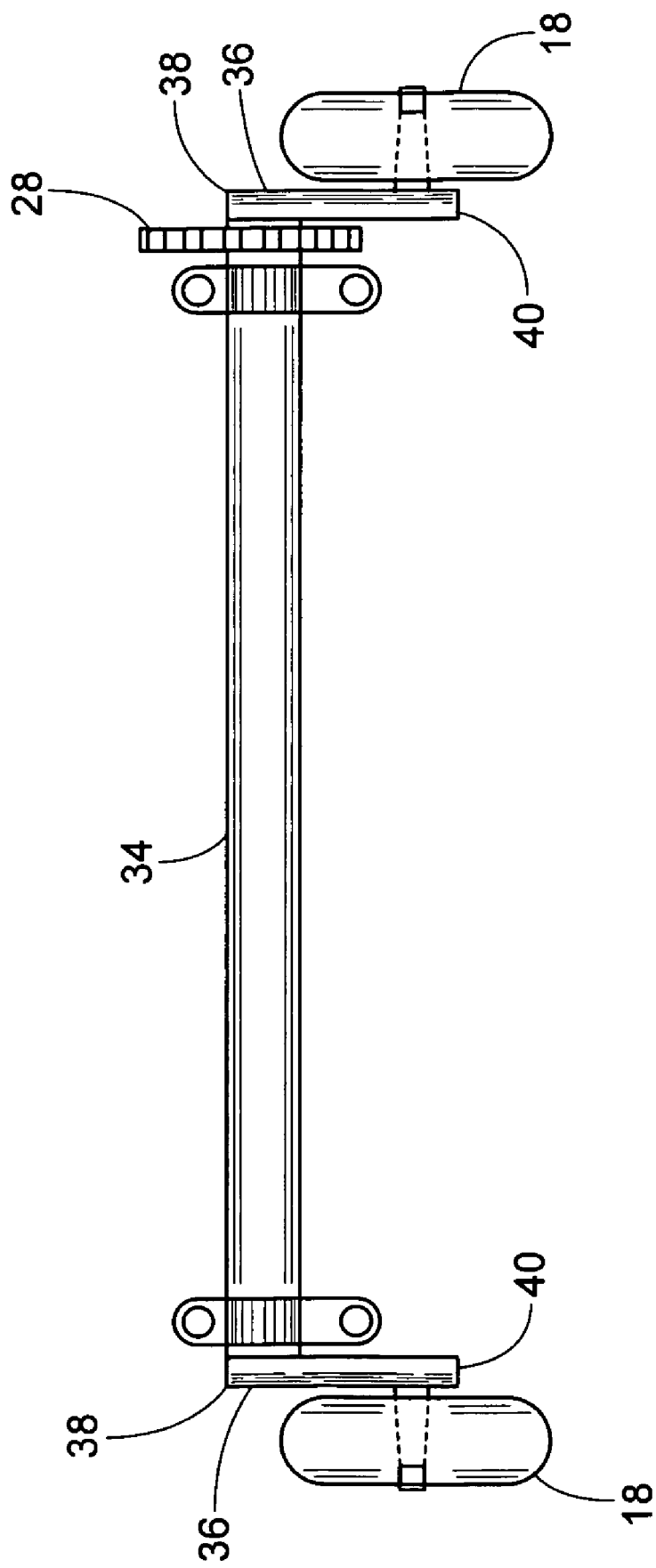
FIG. 2 is an end view of the trailer axle and the assembly for raising and lowering the trailer.
Figure 3:
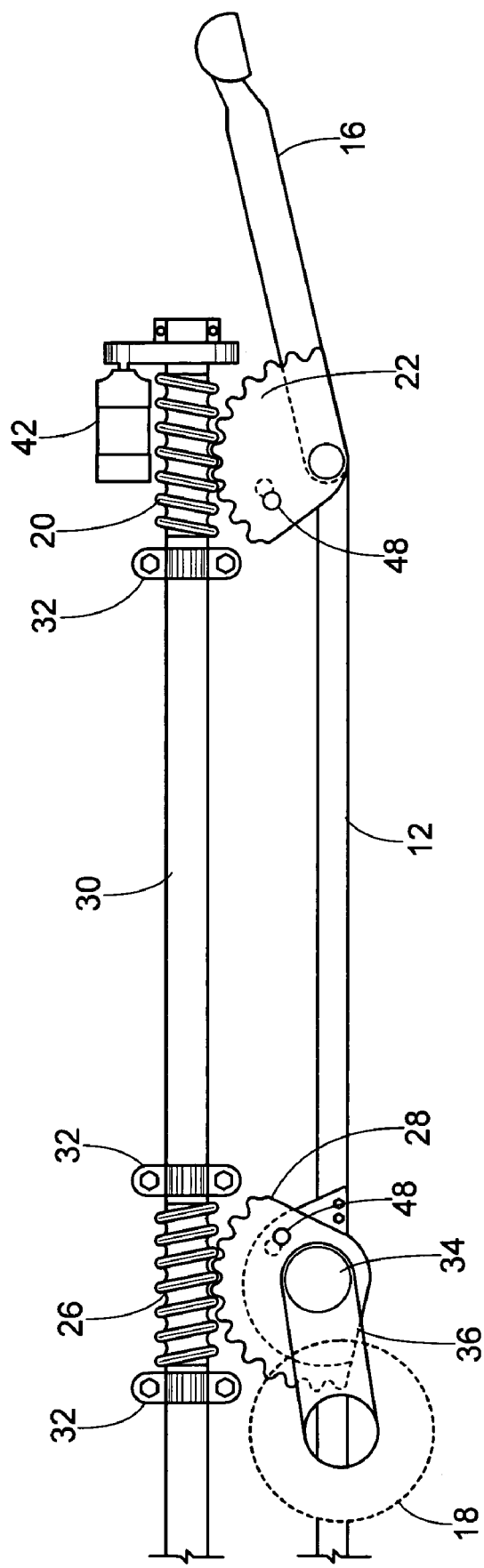
FIG. 3 is a side view of the gearing mechanism.

FIG. 1 is a side view of the assembly of the present invention for raising and lowering a transport trailer and transport trailer bed for loading and unloading the trailer, and FIG. 2 is an end view of the trailer axle and assembly. FIG. 3 is a side view of the gearing mechanism.

The trailer body 10 shown in outline is mounted to a floor or frame member identified as the trailer bed 12 and normally would have a means of ingress and egress in the form of door 14 at the rear 15 of the trailer. The trailer would be secured and towed by a vehicle (not shown) by means of a V-shaped tow hitch 16 coupled to a hitch mounted on the rear of the vehicle. The transport trailer may have side walls 13 or partial side walls and a top wall 17 enclosing the transport material.

The transport trailer 10 would normally have at least one pair of wheels 18 transversely mounted to the trailer bed 12. As illustrated in FIG. 1 it can be seen that the trailer bed 12 of the trailer 10 is elevated off of the ground in order that the trailer 10 may be towed by a vehicle.

The instant idea for an assembly and method for raising and lowering the trailer bed arose through the use of a trailer used to transport custom motorcycles. In order to load the custom motorcycles, a plurality of ramps had to be assembled at the rear of the trailer to allow the motorcycles to be pushed up onto the trailer bed. This usually required the aid of several people and was a cumbersome and delicate task because of the width of the ramp. Applicant's assembly allows for the trailer bed to be lowered to ground level to facilitate loading and unloading.

The assembly and method comprises a first worm gear 20 and one quarter bevel gear 22 in contacting relationship mounted at a front end 24 of the trailer 10 and a second worm gear 26 and one quarter bevel gear 28 in contacting relationship positioned on the transverse axle 34. The first and second worm gears are mounted on a gearing shaft 30 which extends from the front 24 of the trailer 10 to the rear 15 of the trailer 10 and is stabilized by a plurality of shaft journal bearings 32. Second quarter bevel gear 28 is rotatably mounted on transverse axle 34 which in turn has mounted thereon a pair of swing arms 36 on opposing sides of the transport trailer, swing arms 36 having a first end 38 secured to the transverse axle 34 and the second end 40 for mounting the wheel and tire 18. There is also associated with the first worm gear 20, a motor and suitable reduction gears 42. Associated with the rear end of shaft 30 is a manual connector 44 for receipt of a hand crank 46.

Each of the quarter bevel gears 22 and 28 have associated therewith, self-locking pins 48 which lock the bevel gears in position when the trailer body is in a raised position. Self locking pins are disengaged by pulling them outwardly and twisting so as to disengage. They are automatically engaged when the bevel gears are rotated to the transport trailers raised position.

In the configuration illustrated in FIG. 1, first worm gear 20 is a left hand thread worm gear and second worm gear 26 is a right hand thread worm gear.

In an operation with the trailer in a raised position, the operator would disengage the self-locking pins 48 on first and second quarter bevel gears 22 and 28. The operator then has a choice of either manually or electrically or under an alternative power source lowering the trailer. If the operator chooses to electrically lower the trailer, the electric motor 42 would be switched on which would cause the rotation of shaft 30 my means of the reduction gears and first worm gear 20. First worm gear 20 would commence to rotate the first quarter bevel gear 22 in a first direction and second worm gear 26 would commence to rotate second quarter bevel gear 28 in an opposing direction. The rotation of second quarter bevel gear 28 would cause swing arms 36 and the wheels 18 and tires mounted thereon, to gradually move upwardly (see dotted figure) and the bed 12 of the trailer 10 would slowly be lowered to the surface upon which the tires were resting. In this manner, the material to be loaded into the trailer would be facilitated because there would be no height restriction as when the trailer is in a raised position. Simultaneously, the V-shaped yoke 16 would extend downwardly to lower the front end of transport trailer 10.

To raise the trailer, the electric motor would be engaged in a reverse manner and the worm gears 20 and 26 would cause their respective quarter bevel gears 22 and 28 to rotate in opposing directions thereby causing swing arms 36 with wheels and tires 18, to rotate downwardly and yoke 16 upwardly thereby lifting the trailer upwardly to its fixed height. Upon reaching that height, the self-locking pins 48 would automatically engage with their seats to maintain that height.

As an alternative to the electric motor for power raising and lowering, shaft 30 and the respective first and second worm gears 22 and 26 can be rotated by a hand crank 46 engageable in the manual connector 44 of shaft 30 and accomplish the same motion as the electric motor.

The present assembly has been illustrated with a trailer having one set of wheels. The assembly can be adapted to a trailer having more than one set of wheels by mounting each set of wheels on a swing arm and having worm gear and one quarter bevel gear associated with each swing arm. Still further, the assembly is illustrated with the associated worm drive gears and gearing shaft and bevel gears on one side of the transport trailer. Depending upon size and weight, an identical assembly could be positioned on the opposing side of the transport trailer and driven off of the same power source.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A transport trailer and mechanical assembly for raising and lowering the bed of the trailer to ground level to facilitate loading and unloading, the transport trailer assembly and mechanical assembly comprising:

a transport trailer having a trailer bed, having a rear loading end, and a front hitching end, and longitudinal side walls, said front hitching end having a V-shaped yoke member removably securable to a trailer hitch of a vehicle, said transport trailer further having at least one transverse axle, said transverse axle having a wheel attached to opposing ends thereof;

a mechanical assembly for raising and lowering said transport trailer, said raising and lowering mechanism comprising said V-shaped yoke member pivotally secured to said front end of said trailer by means of a transport pinion, said transport pinion having further mounted thereon a one quarter bevel gear and locking pin;

said at least one transverse axle having mounted at opposing ends thereof, a one quarter bevel gear with locking pin and a rigid swing arm having a first end secured to said transverse axle, said rigid swing arm having a wheel attached to a second end thereof;

a gearing shaft mounted to said side wall of said transport trailer by means of a plurality of journaled brackets, said gearing shaft having a left hand worm drive gear in communication with said quarter bevel gear on said front of said transport trailer and a right hand worm drive gear in communication with said quarter bevel gear mounted to said transverse axle;

said gearing shaft in communication with a power source so as to rotate said gearing shaft and said respective left hand and right hand worm drive gears to cause rotation to said quarter bevel gears so as to cause said swing arms and said wheels mounted thereon to move upwardly and simultaneously causing said transport pinion to move downwardly, to lower said bed of said trailer to said ground level and facilitate loading and unloading of said transport trailer;

said gearing shaft rotating in an opposite direction so as to cause said respective quarter bevel gears to rotate causing said swing arm and said wheel member to rotate downwardly while simultaneously causing said transport pinion and said front end of said trailer to move upwardly raising said trailer bed to the desired height for transport.

2. The transport trailer and mechanical assembly in accordance with claim 1 wherein said power source for said gearing shaft is an electric motor in geared communication with said gearing shaft.

3. The transport trailer and mechanical assembly in accordance with claim 1 wherein said power source for said raising and lowering said transport trailer is a hand crank engageable with an end of said gearing shaft at said rear end of said transport trailer for manually rotating said gearing shaft and said left hand worm drive and right hand worm drive for raising and lowering said trailer bed.

* * * * *